Figures 10, 11:
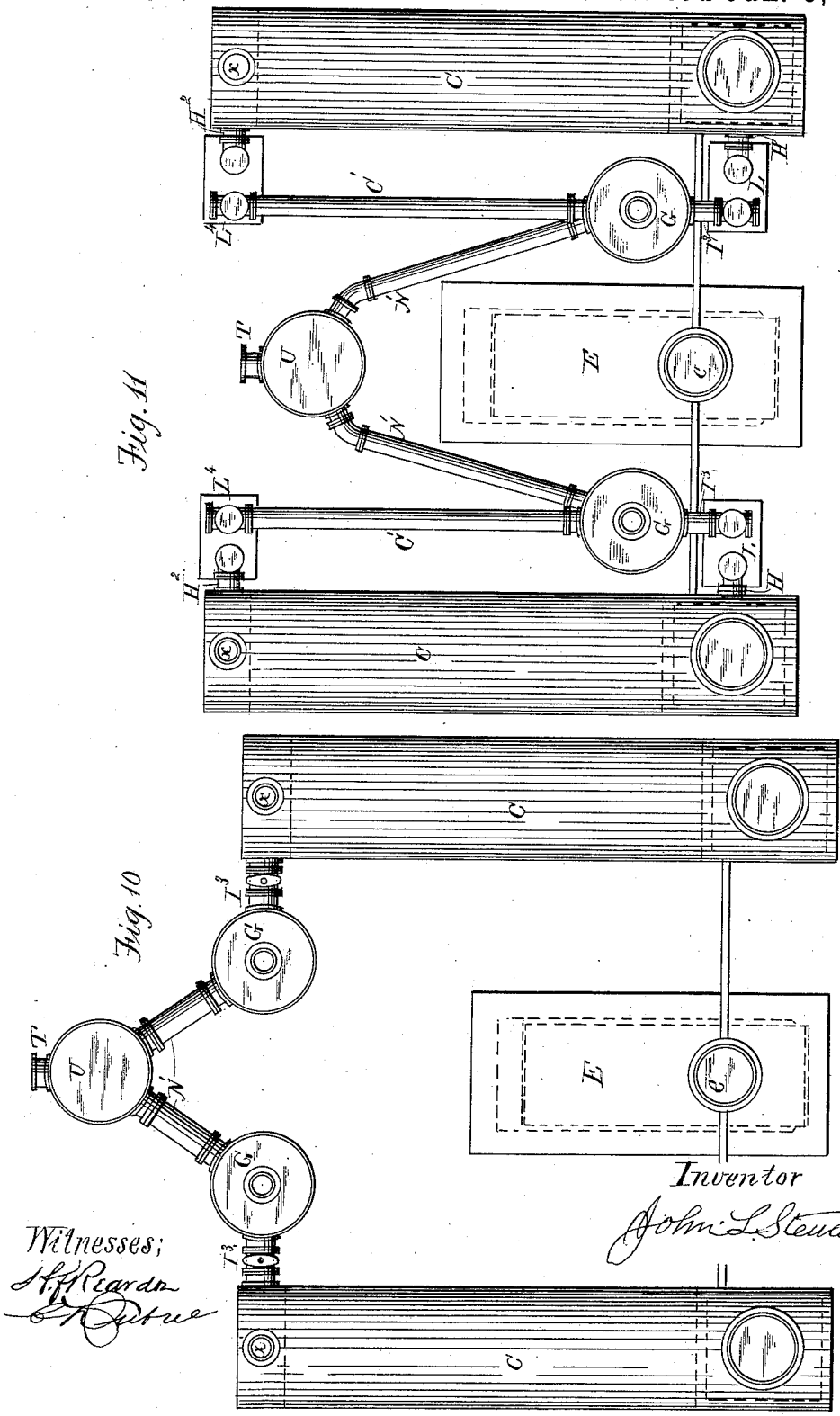

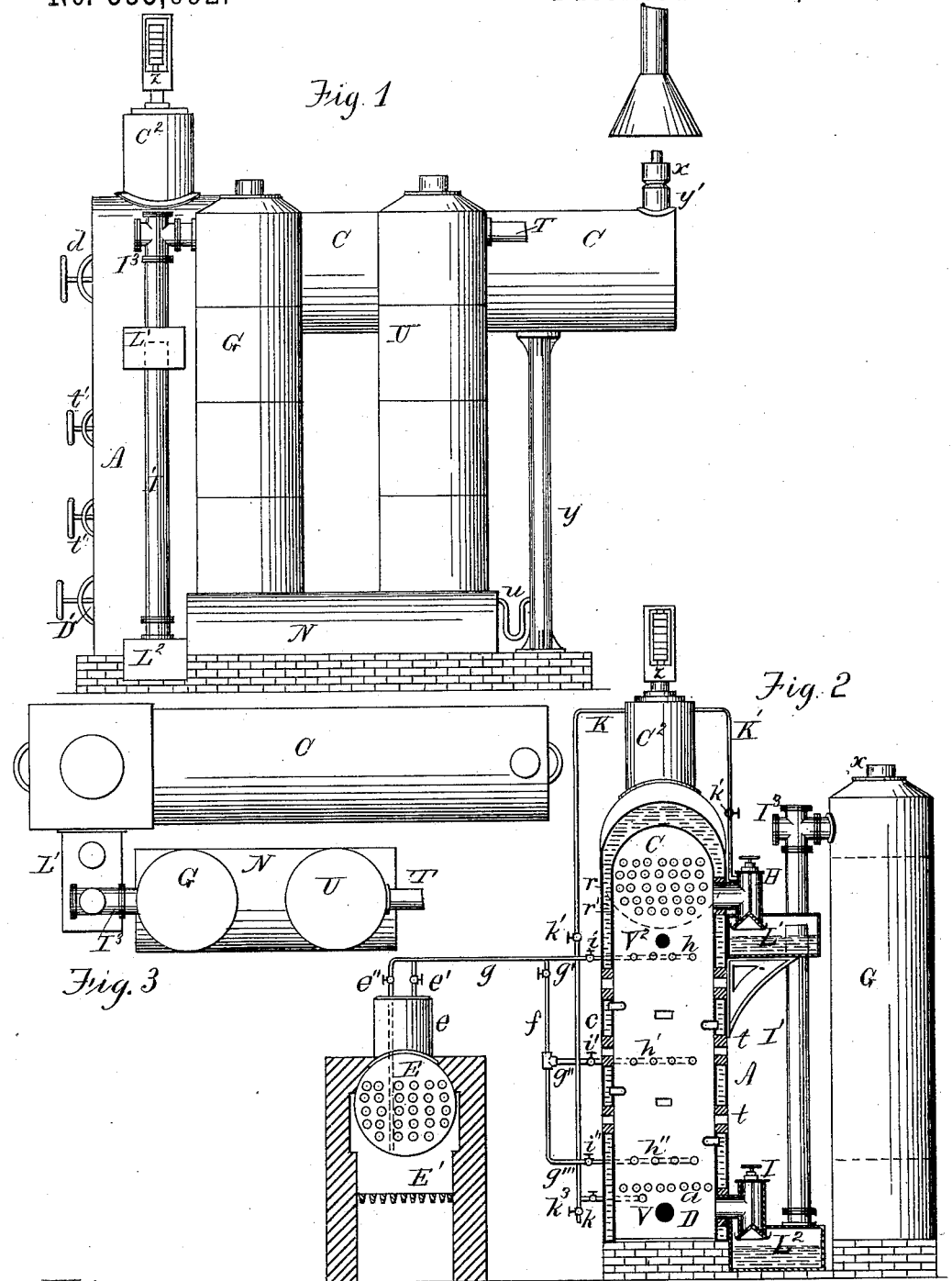

(No Model.) 4 Sheets—Sheet 2.
J. L. STEWART.
PROCESS OF MANUFACTURING GAS.
No. 333,692. Patented Jan. 5, 1886.
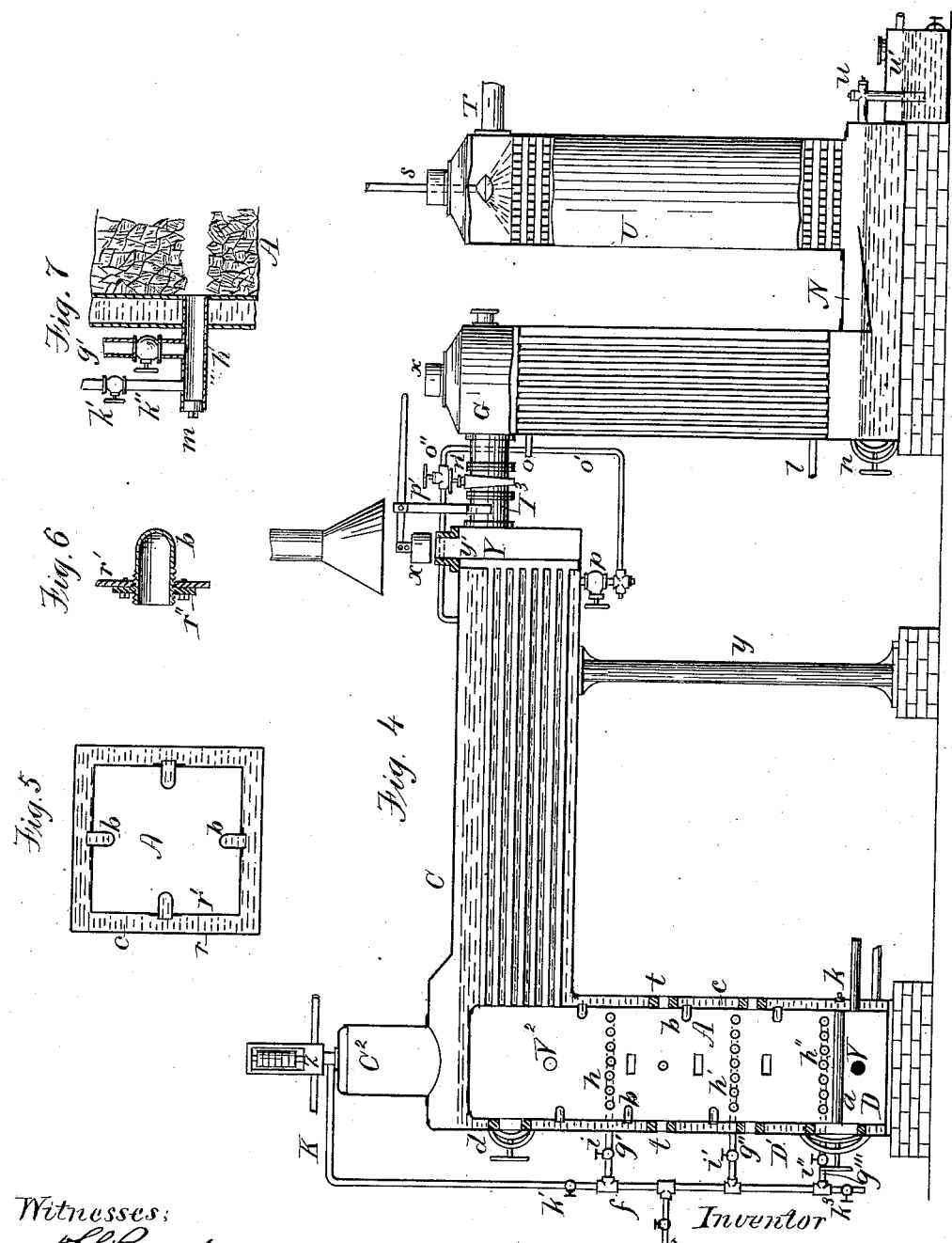

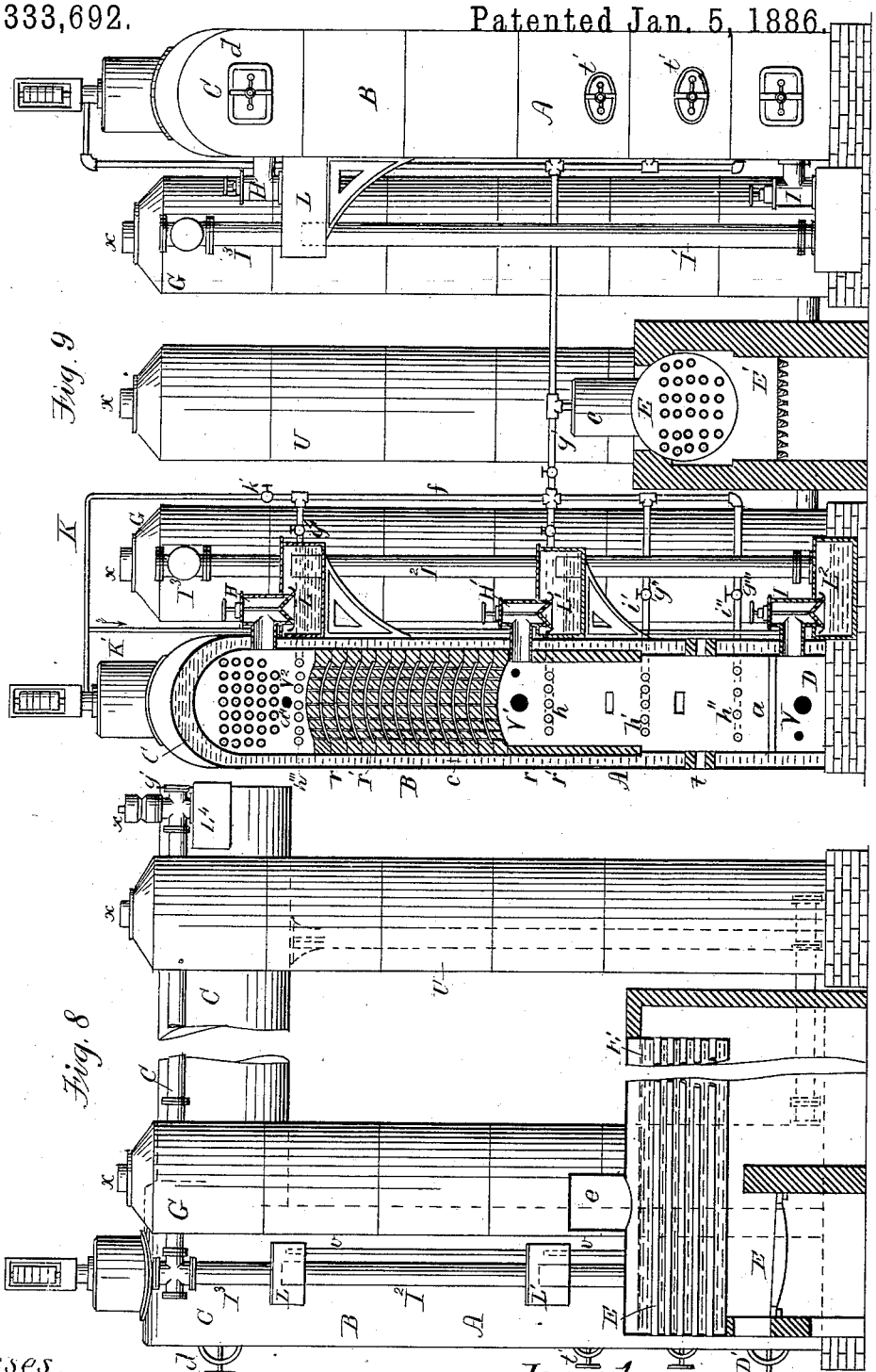

(No Model.) 4 Sheets—Sheet 4.
J. L. STEWART.
PROCESS OF MANUFACTURING GAS.

No. 333,692. Patented Jan. 5, 1886.

Witnesses:
Inventor
John L. Stewart.

UNITED STATES PATENT OFFICE.

JOHN L. STEWART, OF PHILADELPHIA, PENNSYLVANIA.

PROCESS OF MANUFACTURING GAS.

SPECIFICATION forming part of Letters Patent No. 333,692, dated January 5, 1886.

Application filed June 15, 1885. Serial No. 168,822. (No specimens.)

*To all whom it may concern:*

Be it known that I, JOHN L. STEWART, a citizen of the United States, residing at Philadelphia, in the county of Philadelphia and State of Pennsylvania, have invented certain new and useful Improvements in Process of Manufacturing Gas, of which the following is a specification, reference being had therein to the accompanying drawings.

This invention relates to the process of manufacturing heating and illuminating gas in an economical manner in the same apparatus and in successive operations, in which a single body of fuel is first used to decompose steam and produce a high quality of heating-gas, and then to convert hydrocarbon oil or vapor into a high candle-power carbureted-hydrogen illuminating-gas.

The object of my invention is to simplify the process of manufacturing gas and obtain a superior product at a reduced expense, also to conveniently produce at will, and store separately, either heating-gas or illuminating-gas or mixtures of the two, whereby any desired quality of gas may be obtained from a pure water-gas composed of hydrogen and carbonic oxide suitable for heating purposes, motive power, and use in incandescent illuminating-burners to a rich hydrocarbon illuminating-gas suitable for use in ordinary gas-burners and other purposes.

The particular improvement in the process constituting my invention herein will be defined in the claims.

The apparatus described and shown in this application is not herein claimed, as it is made the subject of a separate application for patent, bearing Serial No. 169,732, and filed June 25, 1885.

The accompaning drawings represent apparatus suitable for carrying out my improved process.

Figure 1 represents a side elevation of one of the forms of apparatus. Fig. 2 represents a vertical transverse section of the generator and oil still or vaporizer. Fig. 3 represents a plan view of the apparatus. Fig. 4 represents a vertical longitudinal section of the apparatus with a modified arrangement of parts. Fig. 5 is a horizontal section of the water-jacket generator. Figs. 6 and 7 are sectional detail views of parts of the apparatus. Fig. 8 represents a side elevation of the apparatus of modified construction, partly in section. Fig. 9 represents a double set of apparatus, partly in front elevation and partly in vertical transverse section. Fig. 10 represents a plan view of a double set of the apparatus shown in Fig. 4. Fig. 11 represents a plan view of the double set shown in Fig. 9.

The process will be fully set forth in the description of operation of the apparatus.

A convenient and simple form of apparatus for carrying out the process is illustrated in Figs. 1, 2, 3, and 4, in which the fuel and generating chamber A is formed by two casings or jackets, $r$ $r'$, of riveted plate-iron, placed one within the other, so as to form a water-space, $c$, between them. They are secured by stay-bolts, and are arched at the tops to form the shell of the horizontal boiler C, which freely communicates with the water-space $c$ of the jackets. The casings forming the walls of the furnace are made rectangular in cross-section, as shown in Fig. 5, and the horizontal tubular boiler C is joined on to them at the top in a manner similar to that used in the construction of locomotive-boilers and fire-boxes. Water-tubes $a$, forming the grate-bars, connect opposite sides of inner jacket, $r'$, so that water may circulate through them, as described and claimed in a separate application. Ash-pit D has an opening for removal of ashes, &c., closed by a tight door, D', and has connecting with it air-blast pipe V, steam-pipe $k$, and gas-outlet pipe I, leading to hydraulic-seal box $L^2$. Pipe I and box $L^2$ are omitted from Fig. 4, but are shown in Figs. 1, 2, and 9. Stoke-holes $t$ are formed at various points in the jacket-walls from near the base of the fuel-chamber to near its top, and are closed by plugs or caps $t'$. Short pieces of pipes or sockets $b$, closed at their projecting ends and open at their attached ends, are screwed into openings in the inner jacket and in the strengthening-plates $r''$, riveted to such jacket. (See Figs. 5 and 6.) They are placed at different heights in each of the side walls, and, being hollow, will be kept sufficiently cool and prevented from burning off by the circulation of water. Such tubular projections are made some inches long, and project far enough into the furnace to support the fuel and prevent it from packing injuriously down upon the grate-bars, and they may be formed with flanges and secured by rivets to the inner jackets. These tubular projections also serve an important and useful purpose in assisting to fracture the coke when bituminous coal is used, as the fuel, by its weight, will settle in the central portion of the furnace first, thus breaking away from the portions supported upon the short pipes. By a suitable arrangement of the number and length of the tubular projections, the generator can be operated with a much deeper bituminous coal fire than it otherwise could, as as they will keep the fuel loose and prevent packing, so that the air and steam will pass through the same more freely. By means of bars inserted in the stoke-holes $t$ and operated to break up masses of fuel, and by the projecting tubes $b$, the whole body of fuel is readily kept in condition for the free passage of air and steam or gas uniformly through its entire area, and improved results thereby secured. A steam-dome, $C^2$, having a safety-valve, $z$, rises from the front end of the boiler, and from such dome steam-pipes K and K′ lead to the interior of the furnace. Pipe K connects by a branch, $k$, with the ash-pit, and pipe K′ communicates with the top of the fuel-chamber through the medium of gas-take-off pipe H. The rear end of the boiler is supported on a column, $y$, and is provided with smoke-chamber Y, having a smoke-escape passage, $y'$, (see Fig. 4,) which may be tightly closed or opened by cap $x$. The generator is supplied with hydrocarbon-oil vapor or hot oil by still or vaporizer E. Such still E is constructed like a tubular boiler, having a vapor-dome, $e$, and is set in furnace E′. Pipe $e'$, having a valve and connecting with the top of the dome, connects with pipe $g$, which connects with vertical pipe $f$, and from this pipe branch pipe $g'$ leads to the top of the fuel and generating chamber A, branch $g''$ leads to the middle portion, and branch $g'''$ leads to the lower portion, just above the grate. These oil-vapor pipes connect with the furnace, as shown in detail view, Fig. 7. Vapor-pipe $g'$ connects with the short horizontal pipe $h$, which opens into the fuel-chamber, and has, at its outer end, a removable cap or plug, $m$, and a steam-pipe, $k''$, having a valve, $k'$, connects with pipe $h$ just back of the vapor-pipe, whereby oil-vapor or hot oil may be blown into the generators by a small jet of steam. Four or more vapor-pipes, $h$, connect with the generator at each level, for better distributing the vapor in the fuel at the particular level where it is admitted. Pipes $h$ lead from vapor-pipes $g'$, pipes $h'$ lead from pipe $g''$, and pipes $h''$ lead from pipe $g'''$ into the fuel-chamber. When the hydrocarbon vapor or steam is introduced into the fuel-chamber above the grate-bars and below the surface of the fuel, it is desirable, before turning on the same, to first run a stoking-bar through pipes $h$, plugs $m$ being removed for the purpose, and thus open passage-ways in the fuel, in order that the vapors may be better distributed through the whole mass of fuel. Oil-still E is adapted to stand a high pressure, and vapor is accumulated in it under pressure to be supplied in the desired quantity to the generator. It has an oil-outlet pipe, $e''$, provided with a valve, extending through the dome down to near its bottom, and connecting externally with pipe $g$, leading to the generator. Heavy residual oil is forced by vapor-pressure in the still to the generator, when desired, by partially closing the valve of pipe $e'$ and opening the valve of pipe $e''$.

The generator shown in Figs. 1, 2, and 3 has an outlet gas-pipe, H, at the top, connecting by a dip-pipe directly with hydraulic-seal box L, and the dip-pipe is provided with a cup and cone-valve for closing its end in box L. Such generator also has a gas-outlet pipe, I, connecting the ash-pit with seal-box $L^2$, pipe I also having a cup and cone-valve. Pipe $I^3$ connects box L with the upper part of the tubular water-heater G, and pipe I′ connects box $L^2$ with box L, opening above the water-line therein, as shown, so that gas may be conducted from either box to the heater by properly operating the valves in pipes H and I. The water-heater G, wash-box N, and scrubber U are of the kind shown in section in Fig. 4. The generator and boiler in the apparatus shown in Fig. 4 are constructed and provided with connections mainly like those in Fig. 2; but in Fig. 4 the rear end of the boiler is connected by a gas-outlet pipe, $I^3$, directly with the top of heater G, pipe $I^3$ being provided with a valve, $n'$. The ash-pit of the generator may also have a gas-outlet pipe, though none is shown. Heater G has a water-supply pipe, $l$, at its base, and outlet-pipes $o$ $o'$, leading from its top to boiler C, and an air-vent pipe, $o''$, leading to the steam-space of the boiler. Valves $p$ and $p'$ are applied, respectively, to pipe $o'$ $o''$. The wash-box has a man-hole closed by a tight-fitting lid, $n$, and an overflow-pipe, $u$, connecting with trap $u'$. Gas-outlet pipe T leads from the top of the scrubber, and water-pipe S, with a rose-head, supplies water to the top of the scrubber. Fig. 10 illustrates in plan view a double set of the apparatus shown in Fig. 4, except that the two heaters G are connected by pipe N′ with a single scrubber, U. Oil-still E is placed between the generators for supplying both of them.

In the modified form of apparatus shown in Figs. 8, 9, and 11 a superheating or fixing chamber B filled with perforated brick arches is built in the generator between the fuel and generating-chamber A and boiler C. An additional gas-outlet pipe, H′, connects the top of the fuel-chamber with seal-box L′, and the additional pipe $I^2$ connects box L′ with box L, into which leads pipe H from the top of the generator above the superheater B, so that three gas-outlet pipes lead from the different portions of the generator, as shown. Steam-pipe K′ connects by branch pipes with three different portions of the furnace—viz., at the top of chamber B above the brick-work, at the top of chamber A above the fuel, and at the base of chamber A below the fuel, or with the ash-pit. Steam-pipe K may also connect with vapor-pipe f, so that steam may be passed through any of the vapor-pipes into different portions of the furnace. Steam-pipe K′ or its branches may connect directly with the gas-outlet pipes H, H′, and I, for conducting steam into the furnace. Overflow-pipes v connect the hydraulic-seal boxes, opening into such boxes slightly below the tops of the connecting gas-pipes I′ I². The rear end of the boiler C has a smoke-escape passage, closed by cap x, and also connects by pipe H² with seal-box L⁴, which is connected by pipe C′ with the top of heater G, as shown in Figs. 8 and 11, so that products of combustion after passing through the boiler may be passed down through the tubular heater and escape by a pipe (not shown) leading from the base thereof. Pipe N′ connects the base of heater G with the base of the scrubber U. (See Figs. 8 and 11.) The heaters and scrubbers may have outlet-passages at the top, closed by tight-fitting caps x. An additional vapor-pipe, g⁴, extends from pipe f to inlet-pipe h‴, above chamber B. The hydrocarbon vapor or oil may be blown in above the superheater and at other parts of the generator by a jet or jets of water-gas under pressure, instead of steam, mentioned with reference to pipe k″, Fig. 7. The pipe for water-gas should be connected to steam-pipe k″ or directly to pipe h. The air-blast pipes V connect below the grate V′, at the top of the fuel-chamber and V² at the top of the superheating-chamber B, whereby gaseous products resulting from combustion of the fuel may be burned both below and above chamber B. By arranging the boiler horizontally and placing an opening and tight fitting-door in the wall opposite the ends of the tubes, such tubes may be readily cleaned. Fuel is charged into the furnace through the opening closed by door d.

The apparatus may be operated in a number of different ways, or at least with modifications in the details of procedure for carrying out my improved process of manufacturing gas.

In heating up the apparatus shown in Figs. 1 to 4, fire is kindled on the grate and fuel gradually fed in, then the air-blast is admitted by pipe V below the grate, cap X being removed from passage y′ at the end of the boiler, and as combustible gases or products are given off from the fuel the air-blast is admitted through pipe V² for causing complete combustion of the gaseous products, and thus generating steam in the boiler. The air-blasts are continued till a deep body of fuel is raised to incandescence, when the air-blasts are shut off and smoke-passage y′ closed by cap x. Steam is now decomposed by passage either up or down through the fuel, resulting in pure water-gas composed of hydrogen and carbonic oxide. The apparatus shown in Fig. 2 being in use, the valve in take-off pipe I below the grate-bars is opened, and steam is admitted through pipe K′ above the fuel and is passed down through the fuel, where it is decomposed, and the resulting gas passes through pipe I, box L², pipes L′, and I³ into the top of heater G, then down through the tubes of such heater, through wash-box N, up through the scrubber, and by outlet-pipe T to the purifier or holder. If thought desirable, steam may be admitted at the ash-pit and decomposed by passage up through the fuel, and the resulting gas passed off through pipe H and the other parts of the apparatus, as above described.

In the apparatus shown in Fig. 4 the water-gas is passed off through the boiler, valve n′ being open, then through the heater, wash-box, and scrubber. The generation of water-gas is continued till the fuel is reduced to the proper temperature for the generation of hydrocarbon-gas, when the steam is shut off or partly so from either the top or bottom of the generator, and oil-vapor is admitted at such portion of the fuel as found most desirable.

During the operations of heating up and decomposing steam, oil-vapor is generated in the still and stored under pressure, so that it may be admitted in the desired volume to the fuel when ready for making illuminating-gas. If a light oil, having a low boiling-point, is used the vapors may be admitted near the base of the fuel and the resulting gas conducted off at the top, or the vapors may be admitted at the top and the resulting gas conducted off at the bottom. The oil-vapor may be blown into the fuel by a small jet of steam or by a jet of water-gas under pressure, the fuel having been opened by the insertion of a bar through pipe h, as described with reference to Fig. 7. The hydrocarbon gas is to be conducted through the heater, wash-box, and scrubber and, if necessary, through purifiers to a holder, where it is mixed with the desired quantity of water-gas or stored separately, as preferred. In case a heavy oil having a high boiling-point is used, it is preferable to use a deep fire or fuel bed, discharge the hydrocarbon vapors near the central portion of such fuel body, and pass it up or down or first one way and then the other, so that it will be decomposed and converted into fixed gas before reaching either the boiler-flues or ash-pit. The oil-vapors are passed upward until the upper portion of the fuel is reduced too low in temperature to produce a fixed gas. Then the upper valve is closed and the lower valve is opened, and the vapors are passed downward till the lower portion of fuel is in like manner reduced in temperature, when the oil-vapor must be shut off and the generator must be reheated, as above described. An important advantage in this process is that I can commingle water-gas with the hydrocarbon vapor from the still in the generator in the following manner: The body of fuel in the generator is first raised by means of the air-blast to incandescence, when the air-blast is shut off and steam admitted and water-gas generated and conducted off till the fuel is reduced to the proper temperature to receive the hydrocarbon vapors. Part of the current of steam is then shut off and the hydrocarbon vapor admitted near the center of the fuel body. The reduced current of steam may be admitted over the fuel, and in passing downward will be decomposed into hydrogen and carbonic oxide by the time it reaches the central portion of the generator, which gases mix with the hydrocarbon vapors, and all are converted into a fixed gas in passing through the lower portion of the fuel, and such gas is passed off by the lower valve and outlet-pipe. The direction of the flow of steam and hydrocarbon vapors can at any moment be reversed by closing the lower and opening the upper gas-valve and shutting off the steam above and admitting it below the body of fuel.

In using bituminous coal it would be more profitable to generate all the gas by a downward current, as by that method all the volatile hydrocarbons, being distilled from the surface-coal in the generator, would be carried down and converted into a fixed gas by the hot fuel below.

The apparatus represented in Figs. 8, 9, and 11 is to be heated up substantially as above described with reference to Figs. 1 to 4, though an additional air-blast is employed above the steam-superheating or fixing chamber B, and gaseous products arising from the fuel when the air-blast is on at the base thereof are partially burned at the top of the fuel-chamber for heating chamber B, and are partially burned above such chamber for heating the boiler C. Gas-outlet pipes H, H', and I being closed and cap $x$ at the rear of the boiler being open, the waste products of combustion are passed through the boiler and out of passage $y'$. Either heating or illuminating gas may be passed out through any of the pipes H, H', or I into a hydraulic-seal box, and thence into the top of heater G, or either kind of gas may be passed through the boiler-flues into seal-box L⁴, and thence by pipe C' forward to the top of heater G.

The operations above described for manufacturing heating and illuminating gas may be carried out in this form of apparatus, and in addition the steam may be superheated preparatory to decomposition by passage through the heated brick-work in chamber B. For instance, steam is superheated by passage down through chamber B, then decomposed by passage down through the incandenscent fuel, and the resulting high-grade heating-gas passed off through pipe I, leading from the ash-pit, then (if desired to manufacture illuminating-gas) when the apparatus is reduced to the proper temperature, shutting off the steam, or the main current of it, and spraying oil or oil-vapors into the top of the superheating-chamber, converting the vapors into a fixed hydrocarbon gas by passing them through such chamber, and, if necessary, through the fuel. The gas is passed off from the fuel-chamber either by pipe H' or pipe I. Of course, after decomposition of steam, oil-vapor might be admitted through pipe $g''$ and inlets $h'$ to the central portion of chamber A, then passed up through the fuel, up through fixing-chamber B, and the resulting fixed hydrocarbon gas passed out either through pipe H or through the boiler, and thence by pipe C' into the top of heater G. The refractory material in chamber B and the fuel in chamber A being at the proper temperature, hydrocarbon liquid may be sprayed, by means of water-gas under pressure, into contact with the heated refractory material, thereby vaporizing such liquid, and the mixed vapor and water-gas are converted into a fixed gas by passing them down through the body of heated fuel.

In the manufacture of fuel-gas it is best to admit the steam above the hot fuel or above the superheater, and pass it down through the fuel, especially if bituminous coal is used as fuel in the generator, as then all the volatile hydrocarbon vapors distilled from the surface-coal during the time gas is being made will pass down with the steam through the incandescent fuel, where it is decomposed and will combine with the water-gas resulting from the decomposition of the steam, thereby greatly enriching the latter as a fuel-gas.

If it is desired to decrease the per cent. of carbonic oxide usually produced, then a fire of less depth may be used, or the steam introduced midway in the heated fuel, so that the principal products of the decomposed steam will be carbonic-acid and hydrogen gases, the carbonic acid being removed by lime purification.

The method of converting hydrocarbon vapor, together with water-gas or a small per cent. of steam, into fixed illuminating-gas by passing it through heated carbonaceous fuel is believed to be advantageous, as carbonic acid present in the water-gas is thus converted into carbonic oxide by taking carbon from the fuel, or carbonic oxide produced by the decomposition of the steam is formed by the union of the oxygen with the highly-heated carbon of the fuel, for the reason that such carbon is much better than the hydrocarbon vapor, and thus causes decomposition and recomposition more readily, whereas, in the usual process of decomposing hydrocarbons in a heated chamber containing refractory brick-work, lime, stone, &c., the carbonic acid, or a portion of it, present in the accompanying water-gas will be changed into carbonic oxide at the expense of the oil-vapor, thus consuming a larger quantity of oil and making the process more expensive.

The fuel when reduced to the temperature at which it ceases to produce pure hydrogen and carbonic oxide from the decomposition of steam is at or near the proper temperature for decomposing and fixing the rich hydrocarbons and producing a high grade of illuminating-gas.

Having described my invention, what I claim, and desire to secure by Letters Patent, is—

1. The process of generating gas which consists in heating a body of fuel to incandescence by combustion thereof, then decomposing steam by passing it through or in contact with such fuel and conducting the resulting heating-gas off from the generating-chamber, then, when the fuel is reduced by such operation to the proper temperature, shutting off the main current and volume of steam, admitting hydrocarbon oil or vapor into contact with the fuel, and converting the resulting vapors into a fixed hydrocarbon gas by passing them through the heated fuel and conducting the gas from the generator.

2. The process of generating gas which consists in decomposing steam by passing a current of it through a body of heated or incandescent fuel and passing off the resulting heating-gas, then, when the fuel is reduced by such operation to the proper temperature, shutting off such current of steam and admitting hydrocarbon oil or vapor into the middle portion of the body of fuel and passing it in either direction, or first in one direction and then in the other, through the fuel and conducting the resulting hydrocarbon gas off from either end of the body of fuel.

3. The process of generating gas which consists in first generating water-gas by passing a current of steam into one end of a body of heated fuel and withdrawing the resulting gas from the other end thereof, then, when the body of fuel is reduced to the proper temperature to receive hydrocarbon vapor, shutting off a portion of such current of steam and admitting hydrocarbon vapor near the center of the body of fuel, whereby it is decomposed into hydrocarbon gas, and at the same time continuing the flow of the reduced current of steam into one end of the body of fuel and mixing the resulting gases of decomposition with the hydrocarbon vapor or gas, and passing the entire product off at the opposite end of the body of fuel, and reversing the direction of the inflowing steam and outflowing gas at will.

4. The process of making both heating and illuminating gas in the same apparatus, which consists in heating up the apparatus by the combustion of fuel and the resulting gaseous products, then superheating and decomposing steam by passing it down through the superheating and decomposing chambers, and conducting the resulting gases off at the base of the fuel-chamber, then, when the apparatus is reduced to the proper temperatue, spraying oil into the top of the superheating-chamber, converting the resulting oil vapors into hydrocarbon gas by passing them through such chamber and conducting the gas off from the fuel-chamber.

5. The process of generating gas which consists in injecting and spraying liquid hydrocarbon, by means of water-gas under pressure, into a chamber containing heated refractory material, thereby vaporizing such liquid, then converting the mixed vapor and water-gas into a fixed gas by passing them down through a body of heated fuel.

6. The process of generating gas which consists in decomposing steam in a body of incandescent fuel till such fuel is reduced to the proper temperature for converting oil or vapor into gas, then shutting off the main current of steam and injecting or blowing hydrocarbon oil or vapor by a small jet of steam or water-gas under pressure into the fuel, thereby forming a fixed hydrocarbon gas and conducting it off from the generator.

7. In the manufacture of heating and illuminating gas in one apparatus, the method of conducting the operation which consists in raising the fuel to incandescence by an air-blast, then decomposing steam by passing it in contact with the heated fuel and withdrawing the resulting heating-gas till the fuel is reduced to the desired temperature for making hydrocarbon gas, then shutting off the steam, and by suitable bars making a number of openings in the fuel, then forcing or blowing hydrocarbon oil or vapor into such openings, so that it may be uniformly distributed in the body of fuel, and thus converting it into a fixed illuminating-gas and passing it from the generator above or below the fuel, as desired.

In testimony whereof I affix my signature in presence of two witnesses.

JOHN L. STEWART.

Witnesses:
H. F. REARDON,
C. DUBREE.